Patented Feb. 2, 1954

2,668,122

UNITED STATES PATENT OFFICE 2,668,122

COMPOSITE LEAD CHROMATE-LEAD SILICATE PIGMENT

Adrian R. Pitrot, Uniondale, N. Y., assignor to National Lead Company, New York, N. Y., a corporation of New Jersey No Drawing. Application October 10, 1951, Serial No. 250,813

2 Claims. (Cl. 106—298)

This invention relates to a novel corrosion inhibitive lead chromate pigment.

Basic lead chromate, $PbO.PbCrO_4$, has long been known as one of the best corrosion inhibitive pigments being generally in a superior class along with such well known pigments as red lead and zinc chromate, commonly known as zinc yellow. Extensive commercial utilization of basic lead chromate is limited, however, by its relatively high material and manufacturing costs.

The principal object of this invention is to provide a pigment which will have the excellent corrosion inhibitive properties of basic lead chromate and which can be produced economically.

The novel pigment of this invention may be prepared by forming an intimate mixture containing PbO, $CrO_3$ and $SiO_2$. This may conveniently be in the form of an intimate mixture of basic lead chromate, litharge and silica. This mixture is then calcined at an elevated temperature. The calcination results in chemical and physical combination of the ingredients thereof to form a composite lead chromate lead silicate pigment containing free silica in which the silica is present without impairment of the corrosion inhibitive properties of the combined and modified lead chromate pigment, which exhibits the characteristic surface properties of basic lead chromate.

As a source of the chromate ingredient, it is preferred to use chromic acid which is readily available, but other chromate materials such as lead chromate, basic lead chromate, ammonium dichromate, or potassium dichromate for instance, may be employed. As a source of silica precipitated silicic acid or fine native silica may be used. It has been found, for instance, that a quartzite which is readily obtainable in powder form is quite satisfactory when ground to sufficient fineness in a suitable mill such as a pebble mill for example.

The proportions of the PbO, $CrO_3$ and $SiO_2$ analytically present in the pigment of this invention may be varied over a considerable range. On a molar basis, a satisfactory product is obtained when there are from 2 to 10 mols of PbO for each mol of $CrO_3$ and from 0.75 to 7.5 mols of $SiO_2$ for each mol of PbO. The preferred range to produce the best combination of pigment properties is a combination of from 4 to 7 mols of PbO for each mol of $CrO_3$ and from 2 to 5 mols of $SiO_2$ for each mol of PbO.

The molar proportions of the constituents as noted above are important and critical. It is assumed that the $CrO_3$ combines with the PbO during the furnacing operation and in addition, the excess PbO over that combining with the $CrO_3$ will combine with part of the $SiO_2$ present. Therefore, the finished product will comprise lead chromate, lead silicate and free silica. The molar proportions, therefore, must insure that sufficient PbO is present to combine with the chromate radical and also that sufficient silica is present to combine with the remaining PbO and also to provide some proportion of excess free silica. As noted, both the $CrO_3$ and $SiO_2$ proportions are dependent on the PbO content. While a proportion of free silica within the range noted is desirable in the product of the instant invention, the more active anti-corrosion compounds cannot be diluted to an indefinite extent by free silica. Therefore, the molar proportion of silica present is restricted to the upper limit of the range within which satisfactory pigment properties are obtained.

While the pigment product of this invention as hereinbefore described consists essentially of PbO, $CrO_3$ and $SiO_2$, incidental impurities which may occur in the raw material or which may be picked up in the manufacturing may be present in minor amounts. These will generally not exceed a total of about 1% and will ordinarily be of a type not significantly effecting the desired properties of the pigment or the process by which it is produced.

While the methods of mixing the ingredients may vary broadly as will be appreciated by those skilled in the art, litharge, normal or basic lead chromate, and silica may be dry mixed in the proper proportions although better results are generally obtained when these ingredients are mixed in the form of an aqueous slurry. An advantageous method is to precipitate basic lead chromate in the presence of finely divided silica in an aqueous medium with constant agitation. When a water slurry containing litharge and finely divided silica is agitated, for instance, lead chromates are readily precipitated by the slow constant addition of chromic acid. It is generally preferable to add a small amount of a so-called solution catalyst such as acetic acid, for instance, for the purpose of accelerating the formation of lead chromates by supplying a greater quantity of lead ions to the solution. The quantity and the basicity of the lead chromate formed will depend on the relative amounts of chromic acid and litharge employed. It is best to produce hydrous tribasic lead chromate, $$3PbO.PbCrO_4.\tfrac{1}{2}H_2O$$

or monobasic lead chromate, $PbO.PbCrO_4$, or a mixture of these two with or without the presence of free unreacted litharge. Employing this method of the addition of chromic acid to an agitated slurry of litharge even in the presence of silica, the most basic lead chromate in the system will form first. It is generally preferable that the proportion required to form the most basic lead chromate be employed, in which case at least 4 mols of litharge will be present for each mol of CrO3.

At the completion of the reaction, the slurry of lead chromate and silica is dewatered and dried. The dewatering operation may be any one of several standard methods such as filtering and drying or feeding the slurry directly to a continuous inclined rotary kiln. The dried slurry is calcined at a temperature of between about 600 to 650° C. for a period of from about 1 to 3 hours. The calcination temperature is quite important in that temperatures below about 400–450° C. are generally ineffective to produce the desired physico chemical combination while temperatures above 700° C. result in a sintered product with an undesirable gritty character. Batches of product calcined at the proper temperature are completely reacted, are desirably soft, and readily ground to pigment particle size requirements.

In order that this invention may be clearly understood, the following example illustrating the preparation of the lead chromate silica pigment of this invention is offered.

Example

14½ liters of water, 2223 grams of litharge and 2070 grams of finely divided silica were placed in a 25 liter glass vessel equipped with a proper stirring device and reacted with the addition of 2.68 grams of glacial acetic acid, all at room temperature. 252 grams of chromic acid anhydride were dissolved in 2 liters of water and while the slurry of litharge and silica was maintained with constant agitation, the chromic acid solution was slowly and constantly added thereto over a period of 1½ hours. At the end of this time, the slurry was filtered, dried and calcined in an electric muffle furnace in suitable dishes at a temperature of 650° C. for 2 hours. The product was found to possess a fine soft texture, was free of grittiness and was found on analysis to contain:

| | Per cent |
|---|---|
| Lead monoxide | 49.9 |
| Chromic acid anhydride | 5.55 |
| Silica | 43.9 |

This product was disintegrated of its soft agglomerates in a swing hammer type mill.

The pigment product of the example was found to possess excellent rust inhibitive properties when formulated into a paint and applied to metal surfaces. For example, the lead chromate lead silicate pigment of the example was ground into a paint together with vehicle and thinner in the following amounts:

| | Per cent |
|---|---|
| Pigment, the example | 50.5 |
| Vehicle | 49.5 |
| | 100.0 |

| Vehicle: | |
|---|---|
| Alkyd resin | 75.9 |
| Thinner and drier | 24.1 |
| | 100.0 |

The above paint was applied by spraying to cleaned strips of cold rolled steel. Three coats were applied for a total film thickness of 0.0025 inch. The panels were allowed to dry in air for 10 days.

The above panels were then exposure tested in comparison to panels similarly painted with coatings of red lead and with zinc chromate in alternate immersion testing machine which consisted of a mechanical device which repeatedly and alternately lifted the panel from complete immersion in synthetic sea water and the air. Each cycle consisted of 4 minutes' immersion and 4 minutes in air. After 63 days, it was found that the painted panels prepared with the lead chromate silica pigment of this invention were either slightly better or equal to those painted with red lead and were definitely superior to those painted with zinc chromate. Numerical ratings for blistering and corrosion based on physical appearance in accordance with the standard system of the American Society for Testing Materials in which 10 is perfect and 0 is complete failure, gave at rating of 9.5 to the lead chromate silicate paint and to the red lead paint while the zinc chromate paint had a rating of 7 after 63 days.

The combination of the constituents in the pigment product of this invention is physico-chemical, that is, in part physical and in part chemical. It is evident that chemical compounds are formed by dry reaction between the $CrO_3$, $PbO$ and $SiO_2$ and also that the free silica is physically combined with these reaction products. The free silica particles appear to be coated with lead silicate and lead chromate to produce a surface anti-corrosion pigment effect.

It will be generally appreciated from the above results that the novel composite lead chromate lead silicate pigment product of this invention combines the excellent corrosion resistant metal protective pigment properties of lead chromate pigments with economy in the presence of silica, thus offering an economical superior corrosion inhibitive pigment product.

While this invention has been described and illustrated by the example shown, it is not intended to be strictly limited thereto and other modifications and variations may be employed within the scope of the following claims.

I claim:

1. A composite lead chromate lead silicate pigment consisting essentially of $PbO$, $CrO_3$, and $SiO_2$ in physico-chemical combination, said $PbO$, $CrO_3$ and $SiO_2$ being analytically present so that there are from 2 to 10 mols of $PbO$ for each mol of $CrO_3$ and from 0.75 to 7.5 mols of $SiO_2$ for each mol of $PbO$.

2. A composite lead chromate lead silicate pigment consisting essentially of $PbO$, $CrO_3$, and $SiO_2$ in physico-chemical combination, said $PbO$, $CrO_3$ and $SiO_2$ being analytically present so that there are from 3 to 7 mols of $PbO$ for each mol of $CrO_3$ and from 2 to 5 mols of $SiO_2$ for each mol of $PbO$.

ADRIAN R. PITROT.

References Cited in the file of this patent

UNITED STATES PATENTS

| Number | Name | Date |
|---|---|---|
| 2,044,244 | Harshaw | June 16, 1936 |
| 2,172,997 | Edwards | Sept. 12, 1939 |
| 2,477,277 | Williams et al. | July 26, 1949 |
| 2,563,367 | Read | Aug. 7, 1951 |